US009116528B2

(12) United States Patent
Ukai et al.

(10) Patent No.: US 9,116,528 B2
(45) Date of Patent: Aug. 25, 2015

(54) HYDROGEN GENERATION APPARATUS, FUEL CELL SYSTEM, AND METHOD OF OPERATING THE SAME

(75) Inventors: Kunihiro Ukai, Nara (JP); Tomoya Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 318 days.

(21) Appl. No.: 13/816,092

(22) PCT Filed: Apr. 20, 2012

(86) PCT No.: PCT/JP2012/002752
§ 371 (c)(1),
(2), (4) Date: Feb. 8, 2013

(87) PCT Pub. No.: WO2012/147317
PCT Pub. Date: Nov. 1, 2012

(65) Prior Publication Data
US 2013/0130138 A1 May 23, 2013

(30) Foreign Application Priority Data

Apr. 26, 2011 (JP) ................................. 2011-097856
Apr. 26, 2011 (JP) ................................. 2011-097857

(51) Int. Cl.
*H01M 8/04* (2006.01)
*H01M 8/06* (2006.01)
(Continued)

(52) U.S. Cl.
CPC *G05D 23/00* (2013.01); *C01B 3/34* (2013.01); *C01B 3/48* (2013.01); *H01M 8/04022* (2013.01);
(Continued)

(58) Field of Classification Search
CPC ........... H01M 8/02; H01M 8/04; H01M 8/06; H01M 8/0606; H01M 8/0618; H01M 8/0612; H01M 8/04022; H01M 8/0444; H01M 8/0473
See application file for complete search history.

(56) References Cited

U.S. PATENT DOCUMENTS 6,210,820 B1 * 4/2001 Knights et al. ................ 429/412
6,551,732 B1 * 4/2003 Xu ................................. 429/412
(Continued)

FOREIGN PATENT DOCUMENTS

CA 2316043 A1 2/2001
EP 1935846 A1 6/2008
(Continued)

OTHER PUBLICATIONS

International Search Report mailed Jul. 3, 2012 issued in corresponding International Application No. PCT/JP2012/002752.
(Continued)

*Primary Examiner* — Kenneth Douyette
(74) *Attorney, Agent, or Firm* — McDermott Will & Emery LLP

(57) ABSTRACT

A hydrogen generation apparatus (100) includes: a reformer (1) configured to generate a hydrogen-containing gas by causing a reforming reaction of a raw material; a combustor (2) configured to heat the reformer; and a controller (5) configured to set a controlled temperature of the reformer to a first temperature when an oxygen concentration in the raw material is in a first state where the oxygen concentration is relatively low, and change the controlled temperature of the reformer to a second temperature higher than the first temperature when the oxygen concentration in the raw material is in a second state where the oxygen concentration is relatively higher than the oxygen concentration in the first state.

13 Claims, 9 Drawing Sheets

(51) Int. Cl.
*H01M 8/22* (2006.01)
*G05D 23/00* (2006.01)
*C01B 3/34* (2006.01)
*C01B 3/48* (2006.01)

(52) U.S. Cl.
CPC ........ *H01M 8/0444* (2013.01); *H01M 8/04738* (2013.01); *H01M 8/0612* (2013.01); *H01M 8/0618* (2013.01); *C01B 2203/0283* (2013.01); *C01B 2203/047* (2013.01); *C01B 2203/0445* (2013.01); *C01B 2203/066* (2013.01); *C01B 2203/0811* (2013.01); *C01B 2203/1258* (2013.01); *C01B 2203/1288* (2013.01); *C01B 2203/169* (2013.01); *C01B 2203/1614* (2013.01); *Y02E 60/50* (2013.01)

(56) References Cited

U.S. PATENT DOCUMENTS

| | | | |
|---|---|---|---|
| 6,887,286 B1 * | 5/2005 | Taki et al. | 48/197 R |
| 2002/0131907 A1 | 9/2002 | Iwasaki | |
| 2002/0136939 A1 * | 9/2002 | Grieve et al. | 429/23 |
| 2005/0129997 A1 | 6/2005 | Maenishi et al. | |
| 2006/0090398 A1 | 5/2006 | Katikaneni et al. | |
| 2006/0143983 A1 * | 7/2006 | Matsui et al. | 48/61 |
| 2009/0155646 A1 * | 6/2009 | Endo et al. | 429/19 |
| 2009/0236265 A1 | 9/2009 | Katikaneni et al. | |
| 2009/0263691 A1 * | 10/2009 | Masui | 429/20 |
| 2011/0192085 A1 | 8/2011 | Katikaneni et al. | |

FOREIGN PATENT DOCUMENTS

| | | | | |
|---|---|---|---|---|
| JP | 58053165 A | * | 3/1983 | H01M 8/06 |
| JP | 61233979 A | * | 10/1986 | H01M 8/04 |
| JP | 63298976 A | * | 12/1988 | H01M 8/06 |
| JP | 09-180744 A | | 7/1997 | |
| JP | 11-195424 A | | 7/1999 | |
| JP | 2000-036313 A | | 2/2000 | |
| JP | 2001-302210 A | | 10/2001 | |
| JP | 2002-179405 A | | 6/2002 | |
| JP | 2002-201002 A | | 7/2002 | |
| JP | 2003-157871 A | | 5/2003 | |
| JP | 2003-183005 A | | 7/2003 | |
| JP | 2003-261304 A | | 9/2003 | |
| WO | WO-2006/065672 A2 | | 6/2006 | |

OTHER PUBLICATIONS

Extended European Search Report issued in corresponding European Application No. 12777509.6, dated Feb. 25, 2014.

* cited by examiner

HYDROGEN GENERATION APPARATUS, FUEL CELL SYSTEM, AND METHOD OF OPERATING THE SAME

RELATED APPLICATIONS

This application is the U.S. National Phase under 35 U.S.C. §371 of International Application No. PCT/JP2012/002752, filed on Apr. 20, 2012, which in turn claims the benefit of Japanese Application No. 2011-097856, filed on Apr. 26, 2011, and Japanese Application No. 2011-097857, filed on Apr. 26, 2011, the disclosures of which Applications are incorporated by reference herein.

TECHNICAL FIELD

The present invention relates to a hydrogen generation apparatus, a fuel cell system, and methods of operating the same. More particularly, the present invention relates to a hydrogen generation apparatus configured to generate a hydrogen-containing gas by using a raw material, a fuel cell system including the hydrogen generation apparatus, and methods of operating the hydrogen generation apparatus and the fuel cell system.

BACKGROUND ART

Fuel cell systems are configured to: supply a hydrogen-containing gas (gas containing $H_2$ gas) and an oxygen-containing gas to a fuel cell stack (hereinafter, simply referred to as a "fuel cell"); cause an electrochemical reaction between hydrogen and oxygen to progress; and extract resultant chemical energy as electrical energy to generate electric power. Fuel cell systems are capable of not only generating electric power with high efficiency, but also readily utilizing thermal energy that is generated during the power generation. Therefore, fuel cell systems are being developed as distributed power generation systems that make it possible to realize highly efficient energy utilization.

Generally speaking, it is often the case that a supply system for supplying the hydrogen-containing gas is not developed. Therefore, conventional fuel cell systems are provided with a hydrogen generation apparatus. A typical hydrogen generation apparatus generates a hydrogen-containing gas (reformed gas) by using, as a raw material, city gas containing natural gas as a main component, LPG, or the like supplied from an existing infrastructure. Accordingly, the hydrogen generation apparatus includes, for example, a desulfurizer configured to remove sulfur components from the raw material and a reformer configured to generate the hydrogen-containing gas by causing a reforming reaction between the raw material and steam at temperatures of 600 to 700° C. by using a Ru catalyst or Ni catalyst (see Patent Literature 1, for example).

Usually, the hydrogen-containing gas obtained from the reforming reaction contains carbon monoxide derived from the raw material. If the carbon monoxide concentration is high, the power generation performance of the fuel cell is degraded. Therefore, it is often the case that the hydrogen generation apparatus includes reactors such as a shift converter, a selective oxidizer, and a methanation remover in addition to the reformer. The shift converter includes a Cu—Zn based catalyst, and causes a shift reaction between carbon monoxide and steam to progress at temperatures of 200° C. to 350° C., thereby reducing carbon monoxide. The selective oxidizer selectively causes a carbon monoxide oxidation reaction at temperatures of 100° C. to 200° C., thereby further reducing carbon monoxide. The methanation remover selectively causes carbon monoxide methanation, thereby reducing carbon monoxide. The selective oxidizer and the methanation remover are also referred to as selective removers.

There are cases where oxygen is temporarily mixed into the raw material due to configurational features of the infrastructure. In this respect, there is proposed a method of pre-reforming an oxygen-containing process gas (e.g., natural gas, peak shaving gas, LPG, etc.) (see Patent Literature 2, for example).

CITATION LIST

Patent Literature

PTL 1: Japanese Laid-Open Patent Application Publication No. 2003-183005

PTL 2: Japanese Laid-Open Patent Application Publication No. 2001-80907

SUMMARY OF INVENTION

Technical Problem

If an oxygen concentration becomes relatively high in the raw material as described in Patent Literature 2, there is a possibility that the reformer is determined to be overheated due to heat generated from an oxidation reaction between hydrogen and oxygen in the hydrogen-containing gas, and thereby operation stop is caused.

The present invention has been made to solve the above problems. An object of the present invention is to provide a hydrogen generation apparatus, a fuel cell system, and methods of operating the same, which are capable of reducing, as compared to conventional art, a possibility that when an oxygen concentration is high in the raw material, the reformer is determined to be overheated and thereby operation stop is caused.

Solution to Problem

In order to solve the above problems, a hydrogen generation apparatus according to the present invention includes: a reformer configured to generate a hydrogen-containing gas by causing a reforming reaction of a raw material; a combustor configured to heat the reformer; and a controller configured to set a controlled temperature of the reformer to a first temperature when an oxygen concentration in the raw material is in a first state where the oxygen concentration is relatively low, and change the controlled temperature of the reformer to a second temperature higher than the first temperature when the oxygen concentration in the raw material is in a second state where the oxygen concentration is relatively higher than the oxygen concentration in the first state.

The above general and specific features may alternatively be implemented in the form of, for example, a fuel cell system and a method of operating a hydrogen generation apparatus.

Advantageous Effects of Invention

The hydrogen generation apparatus, the fuel cell system, and methods of operating the same, according to the present invention are capable of reducing, as compared to conventional art, a possibility that when an oxygen concentration is high in the raw material, the reformer is determined to be overheated and thereby operation stop is caused.

BRIEF DESCRIPTION OF DRAWINGS

FIG. 4 is a flowchart showing an example of a method of operating a hydrogen generation apparatus according to Variation 2 of Embodiment 1.

DESCRIPTION OF EMBODIMENTS

Embodiment 1

Figure 1:
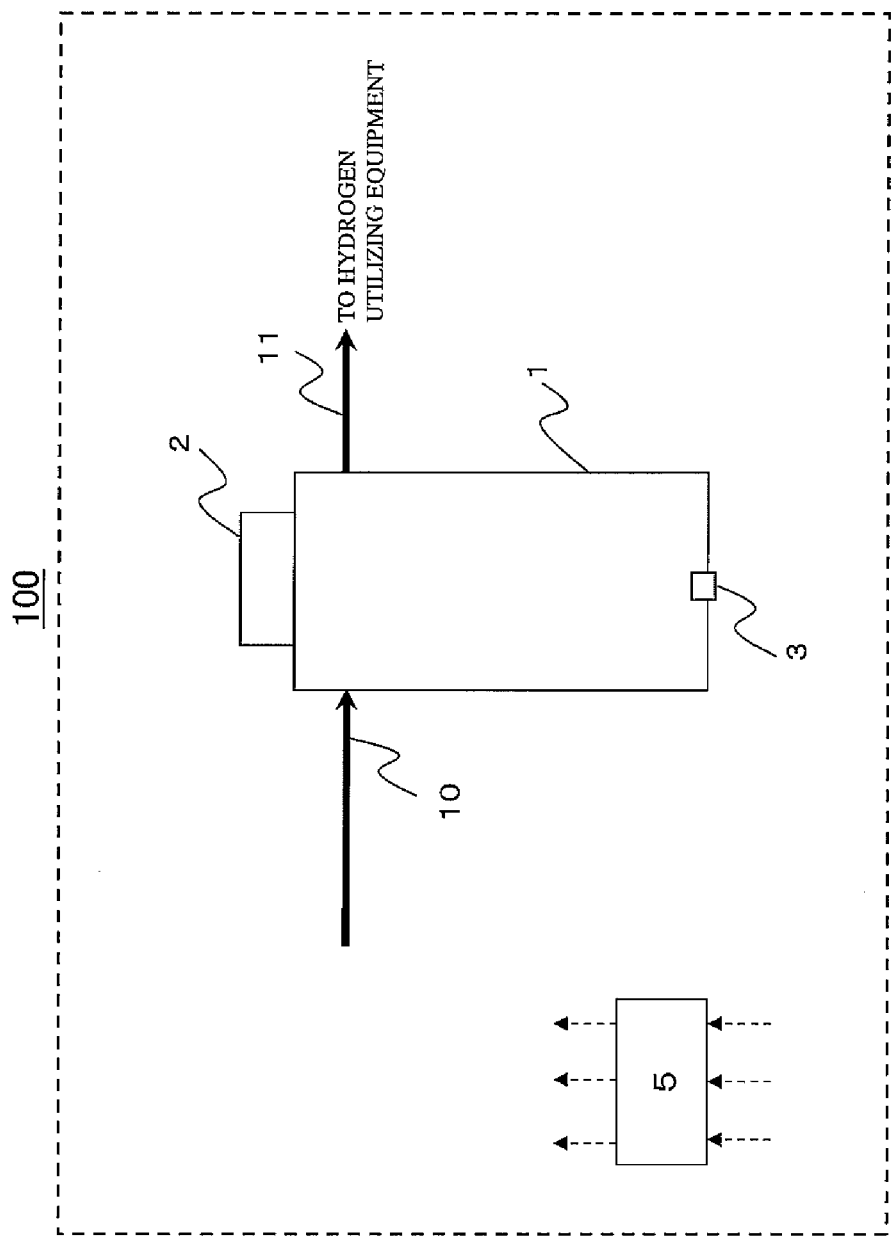
FIG. 1 is a block diagram showing an example of a schematic configuration of a hydrogen generation apparatus according to Embodiment 1.

A hydrogen generation apparatus according to Embodiment 1 includes a reformer configured to generate a hydrogen-containing gas by causing a reforming reaction of a raw material; a combustor configured to heat the reformer; and a controller configured to set a controlled temperature of the reformer to a first temperature when an oxygen concentration in the raw material is in a first state where the oxygen concentration is relatively low, and change the controlled temperature of the reformer to a second temperature higher than the first temperature when the oxygen concentration in the raw material is in a second state where the oxygen concentration is relatively higher than the oxygen concentration in the first state.

A method of operating a hydrogen generation apparatus according to Embodiment 1 includes: generating, by a reformer, a hydrogen-containing gas by causing a reforming reaction of a raw material; heating the reformer by a combustor; setting a controlled temperature of the reformer to a first temperature when an oxygen concentration in the raw material is in a first state where the oxygen concentration is relatively low; and changing the controlled temperature of the reformer to a second temperature higher than the first temperature when the oxygen concentration in the raw material is in a second state where the oxygen concentration is relatively higher than the oxygen concentration in the first state.

The above configuration makes it possible to reduce, as compared to conventional art, a possibility that when an oxygen concentration is high in the raw material, the reformer is determined to be overheated and thereby operation stop is caused.

In the above hydrogen generation apparatus, after changing the controlled temperature of the reformer to the second temperature, the controller may stop an operation if the controller is unable to control a temperature of the reformer at the second temperature.

The "case where the controller is unable to control a temperature of the reformer at the second temperature" refers to, for example, a case where the temperature of the reformer is higher than or equal to a second upper limit temperature which is higher than the second temperature.

The wording, "stop an operation", refers to stopping a hydrogen generation operation of the reformer. Stopping the hydrogen generation operation means stopping at least one of operations that are necessary for causing the reforming reaction of the reformer to progress. For example, stopping the hydrogen generation operation means stopping at least one of an operation of supplying a reaction raw material to the reformer and an operation of heating the reformer. In the case of steam reforming reaction, the reaction raw material contains a raw material and steam; in the case of autothermal reaction, the reaction raw material contains a raw material, steam, and air; and in the case of partial oxidation reaction, the reaction raw material contains a raw material and air.

In the above hydrogen generation apparatus, the controller may stop the operation when the oxygen concentration in the raw material is in a third state which is a state where the oxygen concentration is relatively high in the second state.

[Apparatus Configuration]

FIG. 1 is a block diagram showing an example of a schematic configuration of the fuel cell system according to Embodiment 1.

In the example shown in FIG. 1, a hydrogen generation apparatus 100 according to the present embodiment includes a reformer 1, a combustor 2, a temperature detector 3, and a controller 5.

Hereinafter, an example of configurations of the components included in the example shown in FIG. 1 is described.

The reformer 1 generates a hydrogen-containing gas by causing a reforming reaction of a raw material. The raw material contains an organic compound whose constituent elements are at least carbon and hydrogen. Specific examples of the raw material include hydrocarbons such as natural gas, city gas, LPG, and LNG, and alcohols such as methanol and ethanol. The city gas refers to a gas that is supplied from a gas company to households and the like through piping. The reforming reaction may be any type of reforming reaction. Specific examples of the reforming reaction include steam reforming reaction, autothermal reaction, and partial oxidation reaction.

The hydrogen-containing gas generated by the reformer 1 is supplied to hydrogen utilizing equipment through a hydrogen supply passage 11.

The combustor 2 heats the reformer 1. At least the aforementioned raw material is used as a fuel for the combustor 2. When the hydrogen-containing gas generation is started in the reformer 1, the hydrogen-containing gas is also used as a fuel for the combustor 2.

The hydrogen generation apparatus 100 includes an oxygen concentration state detector configured to detect the state of the oxygen concentration in the raw material. The oxygen concentration state detector may be any detector, so long as the detector is configured to detect the state of the oxygen concentration in the raw material. The state of the oxygen concentration herein is defined to mean at least one of an oxygen concentration value in the raw material and a relative oxygen concentration level in the raw material.

Specifically, at least one of a detector configured to directly detect the state of the oxygen concentration in the raw material and a detector configured to indirectly detect the state of the oxygen concentration in the raw material is used as the oxygen concentration state detector. Examples of the detector configured to directly detect the state of the oxygen concentration in the raw material include an oxygen concentration detector provided on a raw material passage and an information acquisition device configured to acquire oxygen concentration information from an external information holder holding the oxygen concentration information. Examples of the information holder include a user, a server holding oxygen concentration information, a distributor holding oxygen concentration information, and a gas company. The information acquisition device may acquire oxygen concentration information from the information holder in any manner. For example, the information acquisition device may acquire oxygen concentration information by wired communication, wireless communication, etc. Alternatively, oxygen concentration information may be acquired through a user's direct manual input into the information acquisition device.

The detector configured to indirectly detect the state of the oxygen concentration in the raw material is a detector detecting a physical quantity correlated with the state of the oxygen concentration in the raw material. Examples of the detector configured to indirectly detect the state of the oxygen concentration in the raw material include a first detector configured to detect the temperature of a hydrodesulfurizer, a second detector configured to detect the temperature of the reformer, a pressure detector configured to detect the supply pressure of the raw material, an oxygen concentration detector configured to detect an oxygen concentration in the raw material, an ammonia concentration detector configured to detect an ammonia concentration in the hydrogen-containing gas, a temperature detector configured to detect an outdoor temperature, and an information acquisition device configured to acquire raw material composition information correlated with the state of the oxygen concentration. The raw material composition information correlated with the state of the oxygen concentration is, for example, information indicating that peak shaving is being performed.

The oxygen concentration state detector is communicably connected to the controller 5, and transmits to the controller 5 information related to the state of the oxygen concentration. Examples of the information related to the state of the oxygen concentration include the temperature of the hydrodesulfurizer, the temperature of the reformer, and the oxygen concentration.

As mentioned above, the first detector detects, as the temperature of the hydrodesulfurizer, the intensity of heat that is generated when an oxidation reaction occurs between oxygen in the raw material and hydrogen in the hydrogen-containing gas supplied to the hydrodesulfurizer. The controller 5 can determine a relative oxygen concentration level based on a value obtained from the first detector.

A detector configured to directly detect the temperature of the hydrodesulfurizer may be provided at any position, so long as the position allows the detector to detect the temperature of the hydrodesulfurizer. Specific examples of the detector configured to directly detect the temperature of the hydrodesulfurizer include a detector detecting the temperature of the outer casing of the hydrodesulfurizer, a detector detecting the temperature of gas in the hydrodesulfurizer, a detector detecting the temperature of gas that has passed through the hydrodesulfurizer, and a detector detecting the temperature of a catalyst in the hydrodesulfurizer.

A detector configured to indirectly detect the temperature of the hydrodesulfurizer is a detector detecting a physical quantity correlated with the temperature of the hydrodesulfurizer. Examples of the detector configured to indirectly detect the temperature of the hydrodesulfurizer include a detector detecting the sulfur compound concentration in the raw material that has passed through the hydrodesulfurizer, and a detector detecting the carbon monoxide concentration in the raw material that has passed through the hydrodesulfurizer.

If the temperature of the hydrodesulfurizer increases, then a carbon monoxide methanation reaction progresses depending on the type of the hydrodesulfurization catalyst (e.g., CoMo-based hydrodesulfurization catalyst), and hydrogen is consumed by the methanation reaction. As a result, the amount of hydrogenation reaction of sulfur compounds decreases, and the sulfur compound concentration in the raw material that passes through the hydrodesulfurizer increases. Therefore, an increase in the temperature of the hydrodesulfurizer can be detected indirectly, by detecting an increase in the sulfur compound concentration in the raw material by the detector detecting the sulfur compound concentration in the raw material that has passed through the hydrodesulfurizer.

Similarly, if the temperature of the hydrodesulfurizer increases, then an inverse shift reaction progresses depending on the type of the hydrodesulfurization catalyst (e.g., CuZn-based hydrodesulfurization catalyst), causing an increase in carbon monoxide concentration. Therefore, an increase in the temperature of the hydrodesulfurizer can be detected indirectly, by detecting an increase in the carbon monoxide concentration by the detector detecting the carbon monoxide concentration in the raw material that has passed through the hydrodesulfurizer.

The second detector detects, as the temperature of the reformer, the intensity of heat that is generated when an oxidation reaction occurs between oxygen in the raw material supplied to the reformer and hydrogen generated by the reformer. The controller 5 can determine a relative oxygen concentration level based on a value obtained from the second detector.

The second detector may be any detector, so long as the detector is configured to detect the temperature of the reformer. Specifically, at least one of a detector configured to directly detect the temperature of the reformer and a detector configured to indirectly detect the temperature of the reformer is used as the second detector.

The detector configured to directly detect the temperature of the reformer may be provided at any position, so long as the position allows the detector to detect the temperature of the reformer. Specific examples of the detector configured to directly detect the temperature of the reformer include a detector detecting the temperature of the outer casing of the reformer, a detector detecting the temperature of the reforming catalyst, a detector detecting the temperature of gas in the reformer, and a detector detecting the temperature of gas that has passed through the reformer.

The detector configured to indirectly detect the temperature of the reformer is a detector detecting a physical quantity correlated with the temperature of the reformer. Examples of the detector configured to indirectly detect the temperature of the reformer include a hydrogen concentration detector detecting the hydrogen concentration in the hydrogen-containing gas that has passed through the reformer, a temperature detector detecting the temperature of a device (e.g., the hydrodesulfurizer) that receives heat transmitted from the reformer, and a temperature detector detecting the temperature of a device (e.g., a shift converter) through which the hydrogen-containing gas that has passed through the reformer flows.

Usually, before peak shaving is performed, the supply pressure of the raw material is lower than a normal value. When peak shaving is performed in such a state, the supply pressure of the raw material returns to the normal value. If the pressure in a raw material supply passage 10, which is detected by the pressure detector, has returned to the normal value from a value lower than the normal value, then the controller 5 can determine that the oxygen concentration in the raw material is high since the peak shaving has been performed.

Moreover, when the outdoor temperature is low and thermal demand is high, peak shaving occurs in order to compensate for a shortfall of the raw material. Accordingly, for example, if a detection value of the temperature detector configured to detect the outdoor temperature is less than or equal to a value (e.g., −5° C.) at which peak shaving is estimated to occur, then it may be determined that the oxygen concentration in the raw material is high due to the peak shaving. If a decrease in the detection value of the temperature detector configured to detect the outdoor temperature (i.e., a temperature drop) is greater than or equal to a value (e.g., 10° C.) that is estimated to cause peak shaving, then it may be determined that the oxygen concentration in the raw material is high due to the peak shaving.

The oxygen concentration detector can directly detect an oxygen concentration value.

The ammonia concentration detector detects an ammonia concentration in the hydrogen-containing gas. In a case where oxygen is mixed into the raw material, air is usually mixed into the raw material. Accordingly, not only oxygen but also nitrogen is mixed into the raw material. Nitrogen mixed into the raw material reacts with hydrogen generated by the reformer 1, and as a result, ammonia is produced. Therefore, a relative oxygen concentration level can be determined based on a concentration obtained from the ammonia concentration detector.

The temperature detector 3 shown in FIG. 1 is a temperature detector for use in detecting the state of the oxygen concentration in the raw material supplied to the reformer 1. The temperature detector 3 is one example of the oxygen concentration state detector. The temperature detector 3 is disposed at the reformer 1 at a predetermined position that allows the temperature detector 3 to detect a temperature corresponding to the state of the oxygen concentration in the raw material. In other words, the temperature detector 3 is one example of the second detector. For example, the temperature detector 3 is disposed at the upstream side of the reformer 1. The reason for this is as follows: most of oxygen in the raw material that has flowed into the reformer 1 is consumed at the upstream side of the reformer 1 due to an oxidation reaction between oxygen and hydrogen; and therefore, the temperature at the upstream side of the reformer 1 tends to vary in accordance with the state of the oxygen concentration in the raw material.

The controller 5 may be any device, so long as the controller 5 has a control function. The controller 5 includes an arithmetic processing unit (not shown) and a storage unit (not shown) storing control programs. Examples of the arithmetic processing unit include an MPU and CPU. The storage unit is a memory, for example. The controller may be configured as a single controller performing centralized control, or may be configured as a group of multiple controllers performing distributed control in cooperation with each other. The same is true for the controllers in the other embodiments and their variations. In the example of FIG. 1, the controller 5 is communicably connected to the temperature detector 3, and controls the combustion amount of the combustor 2 based on a temperature detected by the temperature detector 3.

The combustion amount of the combustor 2 is controlled by controlling the flow rate of the fuel supplied to the combustor 2. As one specific example, the combustor 2 is configured to perform combustion by using the hydrogen-containing gas generated by the reformer 1, and the combustion amount of the combustor 2 is controlled by controlling the flow rate of the raw material supplied to the reformer 1. It should be noted that the control of the combustion amount of the combustor 2 is not limited to this example. As an alternative example, the hydrogen generation apparatus 100 may include a passage that bypasses the reformer 1 and allows the raw material to be directly supplied to the combustor 2, and the combustion amount of the combustor 2 may be controlled by controlling the flow rate of the raw material supplied to the combustor 2 through the passage.

As another alternative example, the combustion amount of the combustor 2 may be controlled by controlling both the flow rate of the raw material supplied to the reformer 1 and the flow rate of the raw material directly supplied to the combustor 2. That is, the hydrogen generation apparatus 100 controls the combustion amount of the combustor 2 by controlling at least one of the flow rate of the raw material supplied to the reformer 1 and the flow rate of the raw material directly supplied to the combustor 2.

The hydrogen generation apparatus 100 further includes a raw material supply device which is not shown.

The raw material supply device adjusts the flow rate of the raw material supplied to the reformer 1. The raw material supply device may be configured in any manner, so long as the raw material supply device is configured to adjust the flow rate of the raw material. For example, the raw material supply device includes at least one of a booster and a flow rate adjusting valve. For example, the raw material supply device supplies the raw material to the reformer 1 through an adsorption desulfurizer.

The hydrogen generation apparatus 100 further includes a steam supply device which is not shown. The steam supply device supplies steam to the reformer 1. The steam supply device includes an evaporator (not shown) and a water supply device (not shown). It should be noted that it is not necessary for the hydrogen generation apparatus 100 to include a steam supply device if the reforming reaction in the reformer 1 is a partial oxidation reaction.

Although not shown in FIG. 1, the hydrogen generation apparatus 100 may include a carbon monoxide reducer disposed downstream from the reformer 1. The carbon monoxide reducer reduces the carbon monoxide concentration in the hydrogen-containing gas generated by the reformer 1. At least one of a shift converter and a carbon monoxide remover is used as the carbon monoxide reducer. The shift converter reduces carbon monoxide through a shift reaction. The carbon monoxide remover reduces carbon monoxide through at least one of an oxidation reaction and a methanation reaction.

The hydrogen generation apparatus according to the present embodiment sets a controlled temperature of the reformer to a first temperature when an oxygen concentration in the raw material is in a first state where the oxygen concentration is relatively low, and change the controlled temperature of the reformer to a second temperature higher than the first temperature when the oxygen concentration in the raw material is in a second state where the oxygen concentration is relatively higher than the oxygen concentration in the first state.

Figure 2:
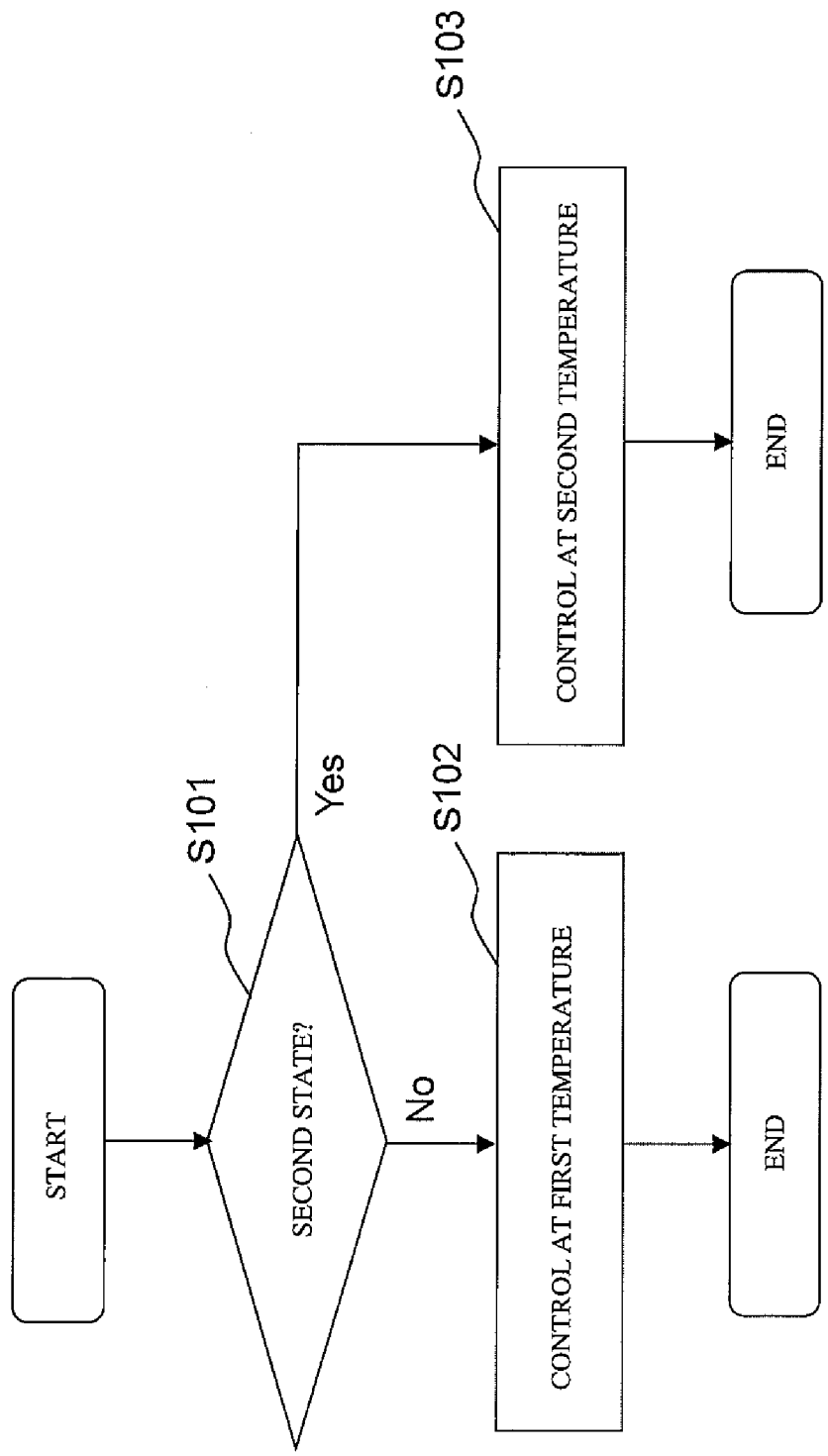
FIG. 2 is a flowchart showing an example of a method of operating the hydrogen generation apparatus according to Embodiment 1.

FIG. 2 is a flowchart showing an example of a method of operating the hydrogen generation apparatus according to Embodiment 1. Hereinafter, an example of the above-described operations of the hydrogen generation apparatus 100 is described with reference to FIG. 2. It should be noted that the operations are performed through control by the controller 5. The same is true for other variations and embodiments.

When the hydrogen generation apparatus 100 starts an oxygen concentration state determination operation (START), the controller 5 determines based on information received from the temperature detector 3 whether the state of the oxygen concentration is the second state (step S101). The first state herein refers to a state where the oxygen concentration in the raw material is relatively low, and the second state herein refers to a state where the oxygen concentration in the raw material is relatively higher than the oxygen concentration in the raw material in the first state. The first state and the second state are suitably set in accordance with the design of the reformer. For example, the first state is set as a state where the oxygen concentration in the raw material is not lower than 0 ppm and not higher than 1000 ppm, and the second state is set as a state where the oxygen concentration in the raw material is higher than 1000 ppm.

The above determination can be performed by determining, for example, whether a temperature detected by the temperature detector 3 is higher than or equal to a predetermined first upper limit temperature or not. In this case, if the detected temperature is higher than or equal to the first upper limit temperature, the oxygen concentration is determined to be in the second state, and if the detected temperature is lower than the first upper limit temperature, the oxygen concentration is determined not to be in the second state, i.e., determined to be in the first state. The first upper limit temperature is defined as a temperature of when the oxygen concentration in the raw material is in the second state. The first upper limit temperature is set to a value lower than the heatproof temperature of the reformer 1. For example, the first upper limit temperature may be set to 700° C.

If the state of the oxygen concentration in the raw material is the first state, the result of the determination in step S101 is No. Accordingly, the controller 5 continues the operation of the hydrogen generation apparatus 100 while maintaining the controlled temperature of the reformer at the first temperature (step S102), and ends the determination operation (END).

If the state of the oxygen concentration in the raw material is the second state, the result of the determination in step S101 is Yes. Accordingly, the controller 5 changes the controlled temperature of the reformer to the second temperature higher than the first temperature (step S103), and ends the determination operation (END). Accordingly, the controller 5 controls the combustion amount of the combustor 2 such that the temperature detected by the temperature detector 3 becomes the second temperature. It should be noted that the first temperature and the second temperature are set to temperatures lower than the heatproof temperature of the reformer 1. For example, the first temperature is set to 670° C. and the second temperature is set to 730° C.

These operations make it possible to reduce, as compared to conventional art, a possibility that when the oxygen concentration is high in the raw material, the reformer is determined to be overheated and thereby operation stop is caused.

The determination as to whether the oxygen concentration in the raw material is in the second state where the oxygen concentration is higher than the oxygen concentration in the first state (step S101 in FIG. 3) may be performed in any method, so long as the method allows the state of the oxygen concentration in the raw material to be determined. For example, the hydrogen generation apparatus 100 includes the oxygen concentration state detector configured to detect the state of the oxygen concentration in the raw material, and a detection value of the detector may be used to perform the determination. In the above example, the temperature detector 3 serves as the oxygen concentration state detector, and whether the oxygen concentration in the raw material is high or low is determined based on a comparison between the temperature detected by the temperature detector 3 and a predetermined threshold temperature.

As one method of determining the state of the oxygen concentration by using the temperature detected by the temperature detector 3, the determination may be performed based on whether an increase rate at which the temperature detected by the temperature detector 3 increases per unit time is higher than or equal to a predetermined first increase rate or not. In this case, if the increase rate is higher than or equal to the first upper limit rate, the oxygen concentration is determined to be in the second state, and if the increase rate is lower than the first upper limit rate, the oxygen concentration is determined not to be in the second state, i.e., determined to be in the first state. The unit of the increase rate is ° C./min, for example. The first upper limit rate is suitably set in accordance with the design of the reformer 1. The first upper limit rate may be 50° C./min, for example. There are cases where temperature increase occurs after the oxygen concentration has increased. The determination using a temperature increase rate makes it possible to detect an increase in the oxygen concentration more promptly than the determination using the temperature itself. In the case of performing the determination using a temperature increase rate, the controller 5 may further include a timekeeper which is not shown. The controller 5 receives, every predetermined period, a temperature detected by the temperature detector 3 and stores the temperature in the storage unit, and calculates a temperature increase rate per unit time.

The method of determining the state of the oxygen concentration in the raw material has been described above regarding a case where the temperature detector 3 is used as the oxygen concentration state detector. The above method may be applied to other cases where a different oxygen concentration state detector is used, and the method can be implemented in the same manner.

Specifically, in a case where the first detector configured to detect the temperature of the hydrodesulfurizer is used as the oxygen concentration state detector, the state of the oxygen concentration in the raw material may be determined based on whether a detection value of the first detector is greater than or equal to a first threshold (e.g., 320° C.) or not. Alternatively, the state of the oxygen concentration in the raw material may be determined based on whether the rate of change in a detection value of the first detector is higher than or equal to a first rate threshold (e.g., 30° C./min) or not.

In a case where the oxygen concentration detector is used as the oxygen concentration state detector, the state of the oxygen concentration in the raw material may be determined based on whether a concentration detected by the oxygen concentration detector is higher than or equal to a first upper limit oxygen concentration (e.g., 1000 ppm) or not.

In a case where the ammonia concentration detector is used as the oxygen concentration state detector, the state of the oxygen concentration in the raw material may be determined based on whether a concentration detected by the ammonia concentration detector is higher than or equal to a first upper limit ammonia concentration (e.g., 8000 ppm) or not.

In a case where the pressure detector is used as the oxygen concentration state detector, the state of the oxygen concentration in the raw material may be determined based on whether a pressure detected by the pressure detector is lower than or equal to a first upper limit pressure value (e.g., +0.5 kPa from the atmospheric pressure) or not.

[Variation 1]

In a hydrogen generation apparatus according to Variation 1, after changing the controlled temperature of the reformer 1 to the second temperature, the controller 5 stops the hydrogen generation operation of the reformer if the controller 5 is unable to control the temperature of the reformer 1 at the second temperature.

According to the above configuration, problems regarding the reformer such as breakdown of the reformer or degradation of the reformer can be reduced.

Other than the above feature, the hydrogen generation apparatus according to Variation 1 may be configured in the same manner as in Embodiment 1.

Next, the hydrogen generation apparatus according to Variation 1 is described in detail.

The hardware configuration of the hydrogen generation apparatus according to Variation 1 may be the same as the one shown in FIG. 1. Therefore, common components between the fuel cell system according to Variation 1 and the hydrogen generation apparatus 100 according to Embodiment 1 are denoted by the same names and reference signs, and a detailed description of such components is omitted.

Figure 3:
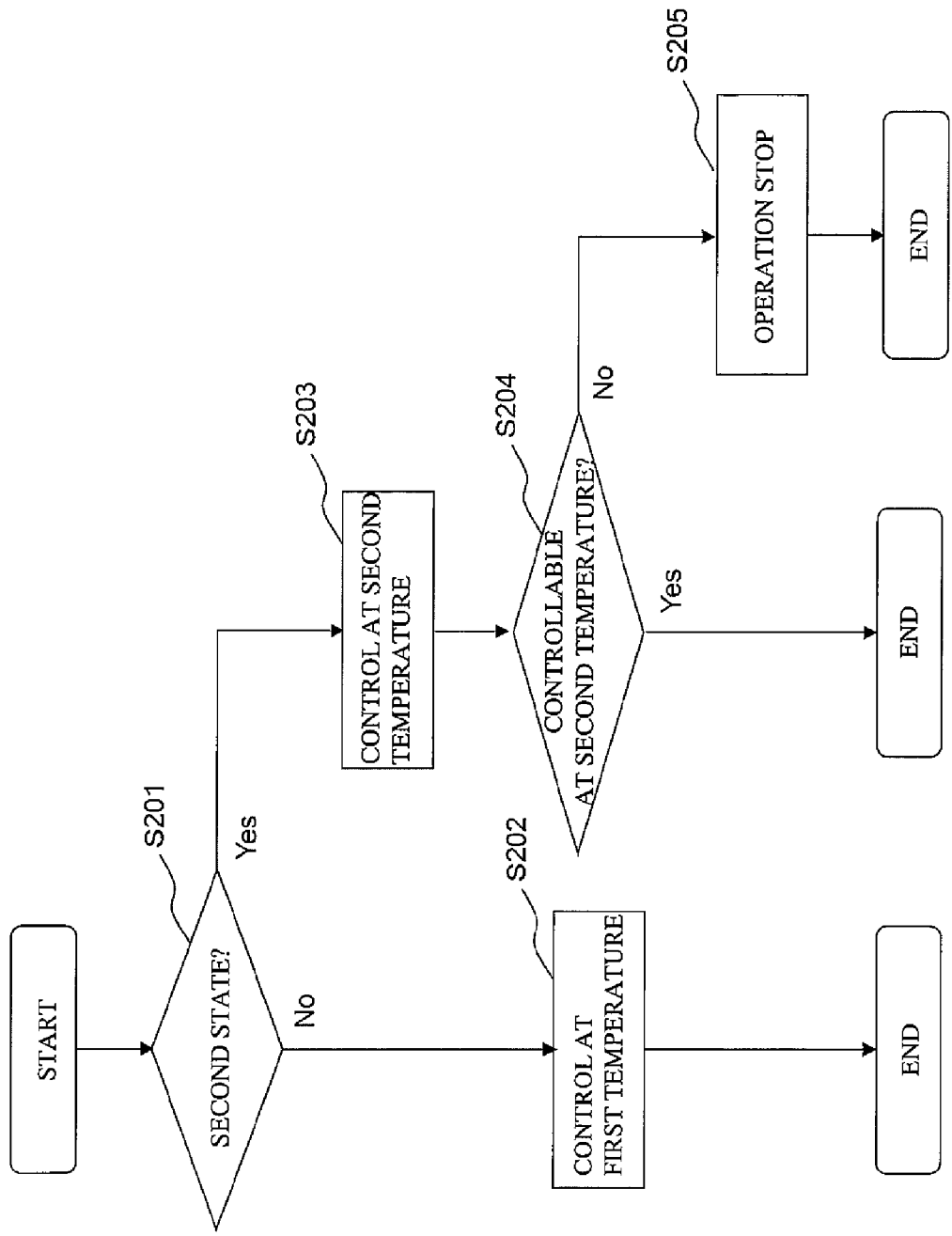

FIG. 3 is a flowchart showing an example of a method of operating the hydrogen generation apparatus according to Variation 1 of Embodiment 1.

Hereinafter, the method of operating the hydrogen generation apparatus according to Variation 1 of the present embodiment is described with reference to FIG. 3.

Since the operations in steps S201 to S203 are the same as the operations in steps S101 to S103 in FIG. 2, a description thereof is omitted.

In Variation 1, after step S203, it is determined whether the temperature of the reformer can be maintained at the second temperature, i.e., whether the temperature of the reformer can be controlled at the second temperature (step S204). The determination as to whether the temperature of the reformer can be maintained at the second temperature may be performed, for example, in the following manner: if the temperature of the reformer that is detected by the temperature detector 3 is higher than or equal to a second upper limit temperature (e.g., 750° C.) which is higher than the second temperature, then it is determined that the temperature of the reformer cannot be maintained at the second temperature. It should be noted that the second upper limit temperature is set to a temperature lower than the heatproof temperature of the reformer 1.

If the temperature of the reformer 1 can be controlled at the second temperature, the result of the determination in step S204 is Yes. Accordingly, the operation of the hydrogen generation apparatus is maintained while the controlled temperature of the reformer is maintained at the second temperature, and the determination operation is ended (END).

If the temperature of the reformer 1 cannot be controlled at the second temperature, the result of the determination in step S204 is No. Accordingly, the operation of the hydrogen generation apparatus is stopped (step S205) and the determination operation is ended (END).

In stopping the operation of the hydrogen generation apparatus 100, the raw material supply device (not shown) and the water supply device (not shown) are stopped from operating, and the hydrogen generation operation of the reformer is stopped. It should be noted that, in stopping the operation of the hydrogen generation apparatus 100, the combustion by the combustor 2 may be stopped in addition to stopping the raw material supply device (not shown) and the water supply device (not shown) from operating.

[Variation 2]

In a hydrogen generation apparatus according to Variation 2, the controller 5 stops the hydrogen generation operation of the reformer when the oxygen concentration in the raw material is in a third state which is a state where the oxygen concentration is relatively high in the second state.

According to the above configuration, problems regarding the reformer such as breakdown of the reformer or degradation of the reformer can be reduced.

Other than the above configuration, the hydrogen generation apparatus according to Variation 2 may be configured in the same manner as in Embodiment 1.

Next, the hydrogen generation apparatus according to Variation 2 is described in detail.

The hardware configuration of the hydrogen generation apparatus according to Variation 2 may be the same as the one shown in FIG. 1. Therefore, common components between the fuel cell system according to Variation 2 and the hydrogen generation apparatus 100 according to Embodiment 1 are denoted by the same names and reference signs, and a detailed description of such components is omitted.

Figure 4:
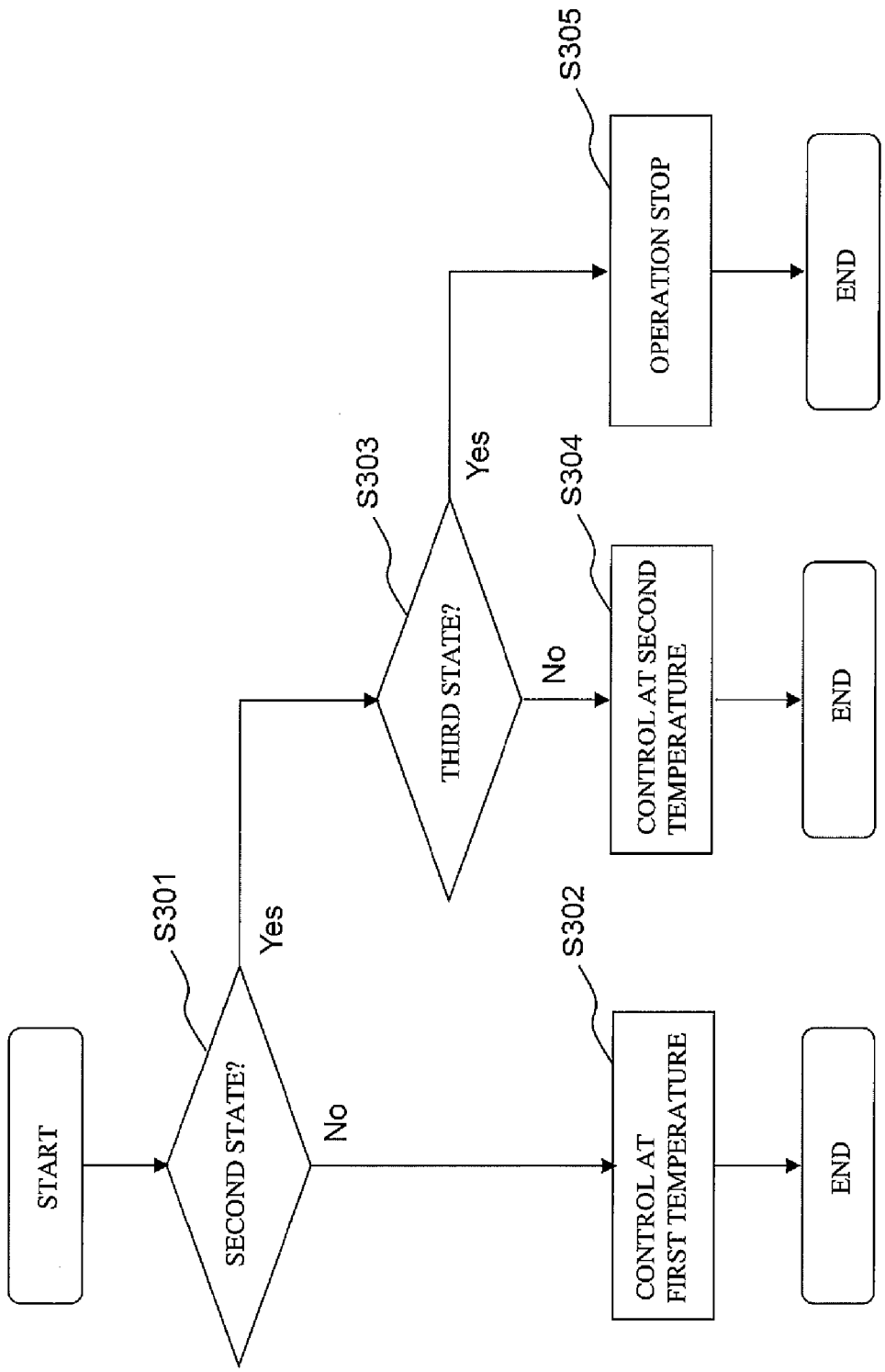
FIG. 4 is a flowchart showing an example of a method of operating a hydrogen generation apparatus according to Variation 1 of Embodiment 1.

FIG. 4 is a flowchart showing an example of a method of operating the hydrogen generation apparatus according to Variation 2 of Embodiment 1.

Hereinafter, the method of operating the hydrogen generation apparatus according to Variation 1 of the present embodiment is described with reference to FIG. 4.

Since the operations in steps S301 and S302 are the same as the operations in steps S101 and S102 in FIG. 2, a description thereof is omitted.

If the state of the oxygen concentration in the raw material is the second state, the result of the determination in step S301 is Yes, and the controller 5 determines based on information received from the temperature detector 3 whether the state of the oxygen concentration is the third state (step S103). The third state herein refers to a state where the oxygen concentration in the raw material is relatively high in the second state. Alternatively, the third state is a state where the oxygen concentration in the raw material is such a concentration level as to hinder the hydrogen generation operation of the reformer from continuing. For example, the third state is defined as a state where there is a possibility that if the hydrogen generation operation is continued, the heatproof temperature of the reformer 1 is exceeded due to overheating caused by an oxidation reaction of hydrogen. For example, the third state is a state where the oxygen concentration in the raw material is higher than 40000 ppm.

The above determination can be performed, for example, by determining whether a temperature detected by the temperature detector 3 is higher than or equal to a predetermined third upper limit temperature or not. In this case, if the detected temperature is higher than or equal to the third upper limit temperature, the oxygen concentration is determined to be in the third state, and if the detected temperature is lower than the third upper limit temperature, the oxygen concentration is determined not to be in the third state. The third upper limit temperature may be suitably set in consideration of the heatproof temperature of the reformer 1. The third upper limit temperature may be set to 760° C., for example.

Similar to Embodiment 1, the above determination on the state of the oxygen concentration in the raw material may be performed by different methods.

Specifically, for example, the oxygen concentration in the raw material may be determined based on the rate of change in the temperature detected by the temperature detector 3. Alternatively, the determination may be made based on a value detected by the oxygen concentration detector, or based on a value detected by the ammonia concentration detector. Further alternatively, the determination may be made based on at least one of a temperature detected by the first detector configured to detect the temperature of the hydrodesulfurizer and the rate of change in the temperature detected by the first detector. Further alternatively, the determination may be made based on detection by the pressure detector configured to detect the supply pressure of the raw material.

In particular, whether the oxygen concentration in the raw material is in the third state may be determined in a manner described below.

For example, in a case where the determination is made based on the rate of change in a temperature detected by the temperature detector 3, the oxygen concentration in the raw material is determined to be in the third state if the rate of change in the temperature is higher than or equal to a second upper limit rate (e.g., 70° C./min) which is higher than the first upper limit rate.

In a case where the first detector configured to detect the temperature of the hydrodesulfurizer is used as the oxygen concentration detector, the state of the oxygen concentration in the raw material may be determined based on whether the temperature detected by the first detector is higher than or equal to a fifth upper limit temperature (e.g., 350° C.) or not. Alternatively, the state of the oxygen concentration in the raw material may be determined based on whether the rate of change in the temperature detected by the first detector is higher than or equal to a fourth upper limit rate (e.g., 40° C./min) or not.

In a case where the oxygen concentration detector is used as the oxygen concentration state detector, the state of the oxygen concentration in the raw material may be determined based on whether a concentration detected by the oxygen concentration detector is higher than or equal to a second upper limit oxygen concentration (e.g., 40000 ppm) or not.

In a case where the ammonia concentration detector is used as the oxygen concentration state detector, the state of the oxygen concentration in the raw material may be determine based on whether a concentration detected by the ammonia concentration detector is higher than or equal to a second upper limit ammonia concentration (e.g., 320000 ppm) or not.

In a case where the pressure detector is used as the oxygen concentration state detector, the state of the oxygen concentration in the raw material may be determined based on whether a concentration detected by the pressure detector is lower than or equal to a second upper limit pressure value (e.g., +0.2 kPa from the atmospheric pressure) or not.

If the oxygen concentration in the raw material is not in the third state, the result of the determination in step S303 is No, and the controller 5 changes the controlled temperature of the reformer 1 to the second temperature while continuing the operation of the hydrogen generation apparatus 100 (step S304), and ends the determination operation (END). Since the operation in step S304 is the same as the operation in step S103 in FIG. 3, a detailed description thereof is omitted.

If the result of the determination in step S303 is Yes, the operation of the hydrogen generation apparatus 100 is stopped (step S305), and the determination operation is ended (END). In stopping the operation of the hydrogen generation apparatus 100, the raw material supply device (not shown) and the water supply device (not shown) are stopped from operating, and the hydrogen generation operation of the reformer is stopped.

It should be noted that variations similar to those made to Variation 1 can be made to Variation 2. To be specific, for example, the operation of the hydrogen generation apparatus 100 may be stopped in the same manner as in Variation 1.

Embodiment 2

A hydrogen generation apparatus according to Embodiment 2 includes: a reformer configured to generate a hydrogen-containing gas by causing a reforming reaction of a raw material; a combustor configured to heat the reformer; and a controller configured such that, when an oxygen concentration in the raw material is in a second state where the oxygen concentration is relatively higher than the oxygen concentration in a first state where the oxygen concentration is relatively low, the controller decreases a flow rate of the raw material supplied to the reformer to be lower than the flow rate of when the oxygen concentration is in the first state.

The hydrogen generation apparatus according to Embodiment 2 may be configured such that, in the hydrogen generation apparatus according to Embodiment 1 and the variations of Embodiment 1, when the oxygen concentration in the raw material is in the second state, the controller decreases the flow rate of the raw material supplied to the reformer to be lower than the flow rate of when the oxygen concentration is in the first state.

A method of operating a hydrogen generation apparatus according to Embodiment 2 includes: generating, by a reformer, a hydrogen-containing gas by causing a reforming reaction of a raw material; heating the reformer by a combustor; decreasing, when an oxygen concentration in the raw material is in a second state where the oxygen concentration is relatively higher than the oxygen concentration in a first state where the oxygen concentration is relatively low, a flow rate of the raw material supplied to the reformer to be lower than the flow rate of when the oxygen concentration is in the first state.

The method of operating a hydrogen generation apparatus according to Embodiment 2 may be such that, the method of operating a hydrogen generation apparatus according to Embodiment 1 and the variations of Embodiment 1 includes, when the oxygen concentration in the raw material is in the second state, decreasing the flow rate of the raw material supplied to the reformer to be lower than the flow rate of when the oxygen concentration is in the first state.

According the above configuration, the flow rate of the raw material is decreased, so that the amount of hydrogen generation in the reformer decreases, and as a result, the amount of heat generated by a reaction between hydrogen and oxygen decreases. That is, a possibility that when the oxygen concentration in the raw material is high, the reformer is determined to be overheated and thereby operation stop is caused can be reduced compared to conventional art.

In the above hydrogen generation apparatus, when the oxygen concentration in the raw material is in the first state, the controller may set the controlled temperature of the reformer to the first temperature, and when the oxygen concentration in the raw material is in the second state, the controller may decrease the flow rate of the raw material supplied to the reformer such that a temperature of the reformer becomes the first temperature.

In the above hydrogen generation apparatus, when the oxygen concentration in the raw material is in the second state, the controller may lower a target raw material flow rate, which is determined corresponding to a target hydrogen generation amount of the reformer, than the target raw material flow rate of when the oxygen concentration is in the first state.

In the above hydrogen generation apparatus, if the controller is unable to control the temperature of the reformer at the first temperature even when the controller has decreased the flow rate of the raw material, the controller may change the controlled temperature of the reformer to the second temperature higher than the first temperature.

According to the above configuration, a possibility that when the oxygen concentration in the raw material is high, the reformer is determined to be overheated and thereby operation stop is caused is reduced compared to a case where the controlled temperature is not increased.

The "case where the controller is unable to control the temperature of the reformer at the first temperature" refers to, for example, a case where the temperature of the reformer is higher than or equal to a second upper limit temperature which is higher than the first temperature.

In the above hydrogen generation apparatus, after changing the controlled temperature of the reformer to the second temperature, the controller may stop an operation if the controller is unable to control the temperature of the reformer at the second temperature.

The wording, "stop an operation", refers to stopping the hydrogen generation operation of the reformer. Stopping the hydrogen generation operation means stopping at least one of operations that are necessary for causing the reforming reaction of the reformer to progress. For example, stopping the hydrogen generation operation means stopping at least one of an operation of supplying a reaction raw material to the reformer and an operation of heating the reformer. In the case of steam reforming reaction, the reaction raw material contains a raw material and steam; in the case of autothermal reaction, the reaction raw material contains a raw material, steam, and air; and in the case of partial oxidation reaction, the reaction raw material contains a raw material and air.

The apparatus configuration of the fuel cell system according to the present embodiment may be the same as in Embodiment 1. Therefore, common components between Embodiment 1 and Embodiment 2 are denoted by the same reference signs and names, and a detailed description of such components is omitted.

Figure 5:
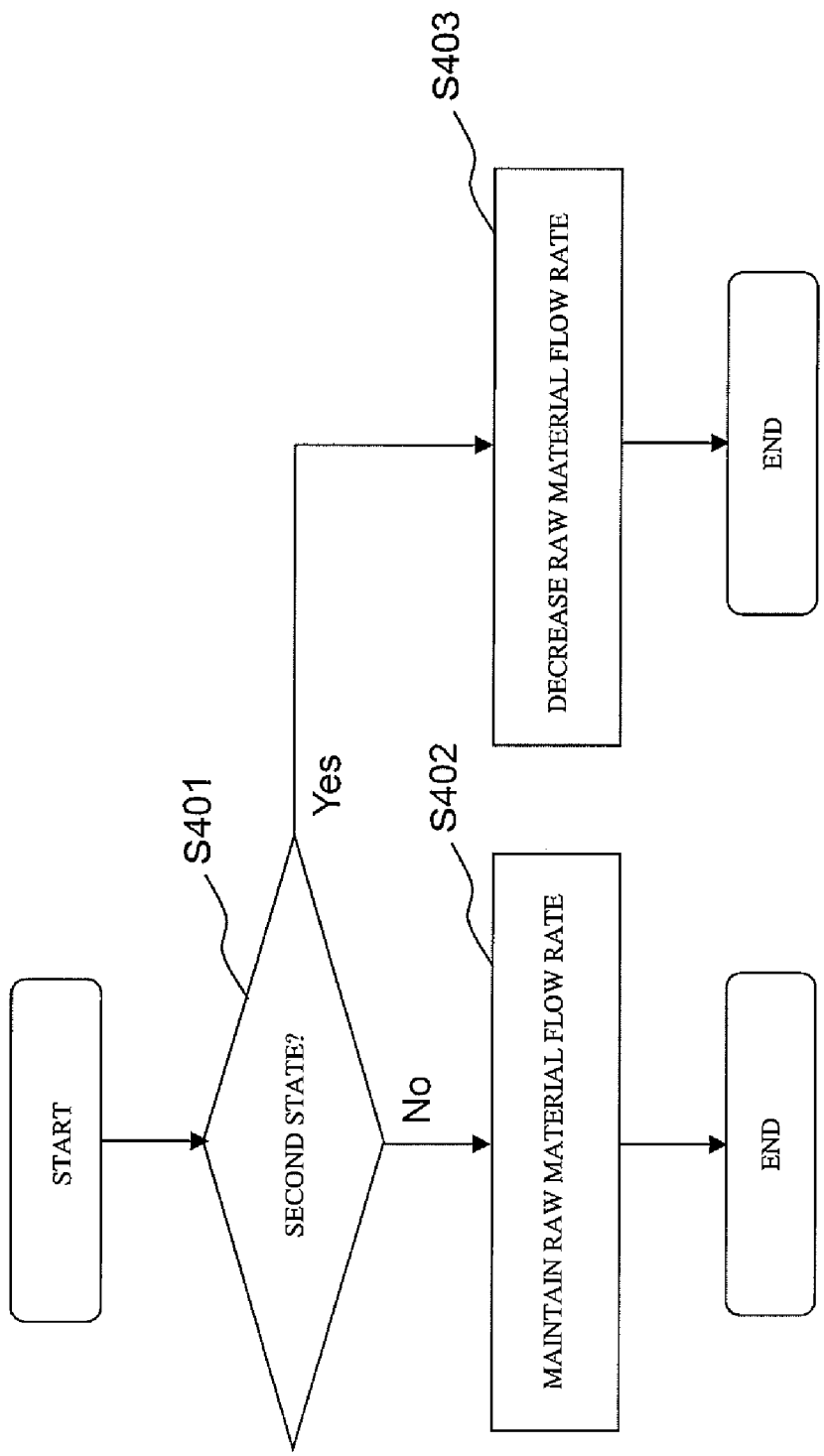
FIG. 5 is a flowchart showing an example of a method of operating a hydrogen generation apparatus according to Embodiment 2.

FIG. 5 is a flowchart showing an example of a method of operating the hydrogen generation apparatus according to Embodiment 2. Hereinafter, an example of the above-described operations of the hydrogen generation apparatus is described with reference to FIG. 5. It should be noted that the operations are performed through control by the controller 5. The same is true for other variations and embodiments.

It should be noted that the description below describes an operating method specific to the present embodiment, and the operating method may be implemented in combination with the operating methods described in Embodiment 1 and its variations.

When the hydrogen generation apparatus starts an oxygen concentration state determination operation (START), the controller 5 determines based on information received from the temperature detector 3 whether the state of the oxygen concentration is the second state (step S401). The first state herein refers to a state where the oxygen concentration in the raw material is relatively low, and the second state herein refers to a state where the oxygen concentration in the raw material is relatively higher than the oxygen concentration in the raw material in the first state. The first state and the second state are suitably set in accordance with the design of the reformer. For example, the first state is set as a state where the oxygen concentration in the raw material is not lower than 0 ppm and not higher than 1000 ppm, and the second state is set as a state where the oxygen concentration in the raw material is higher than 1000 ppm.

The above determination can be performed by determining, for example, whether a temperature detected by the temperature detector 3 is higher than or equal to a predetermined first upper limit temperature or not. In this case, if the detected temperature is higher than or equal to the first upper limit temperature, the oxygen concentration is determined to be in the second state, and if the detected temperature is lower than the first upper limit temperature, the oxygen concentration is determined not to be in the second state, i.e., determined to be in the first state. The first upper limit temperature is defined as a temperature of when the oxygen concentration in the raw material is in the second state. The first upper limit temperature is set to a value lower than the heatproof temperature of the reformer 1. For example, the first upper limit temperature may be set to 700° C.

If the state of the oxygen concentration in the raw material is the first state, the result of the determination in step S401 is No. Accordingly, the controller 5 does not decrease but maintains the flow rate of the raw material supplied to the reformer 1 (step S402), and ends the determination operation (END).

If the state of the oxygen concentration in the raw material is the second state, the result of the determination in step S401 is Yes. Accordingly, the controller 5 decreases the flow rate of the raw material supplied to the reformer 1 (step S403), and ends the determination operation (END).

These operations make it possible to reduce, as compared to conventional art, a possibility that when the oxygen concentration in the raw material is relatively high, i.e., the second state, the reformer is determined to be overheated and thereby operation stop is caused.

The determination in step S401 as to whether the oxygen concentration in the raw material is in the second state where the oxygen concentration is higher than the oxygen concentration in the first state may be performed in any method, so long as the method allows the state of the oxygen concentration in the raw material to be determined. Since the specific details of step S401 may be the same as those of step S101 of Embodiment 1, a detailed description thereof is omitted.

In step S403, one method of decreasing the flow rate of the raw material supplied to the reformer 1 may be, for example, as follows: when the oxygen concentration in the raw material is in the second state, a target raw material flow rate, which is determined corresponding to a target hydrogen generation amount of the reformer 1, is lowered than the target raw material flow rate of when the oxygen concentration in the raw material is in the first state.

Specifically, for example, a storage device which is not shown stores table data indicating a correspondence relationship between target hydrogen generation amounts and corresponding target flow rates of the raw material supplied to the reformer 1 (i.e., target raw material flow rates). Moreover, the table data contains first table data to be used in the first state and second table data to be used in the second state. The storage device stores these table data. For each predetermined target hydrogen generation amount, the value of a corresponding target raw material flow rate stored in the second table data is less than the value of a corresponding target raw material flow rate stored in the first table data.

If it is determined that the oxygen concentration in the raw material is in the first state, the controller 5 refers to the first table data to determine the target flow rate of the raw material supplied to the reformer 1 (target raw material flow rate), the target flow rate corresponding to the target hydrogen generation amount. On the other hand, if it is determined that the oxygen concentration in the raw material is in the second state, the controller 5 refers to the second table data to determine the target flow rate of the raw material supplied to the reformer 1, the target flow rate corresponding to the target hydrogen generation amount.

It should be noted that the method of determining the target raw material flow rate is not limited to the above example. As an alternative example, the storage unit of the hydrogen generation apparatus may store either the first table data or the second table data, and if the oxygen concentration in the raw material is in a state that does not correspond to the table data stored in the storage unit, then a target raw material flow rate in the table data may be multiplied by a predetermined correction factor and thereby the target raw material flow rate may be determined. Specifically, for example, in a case where the storage unit stores only the first table data, if the controller 5 has determined that the oxygen concentration in the raw material is in the second state, then a target raw material flow rate in the first table data is multiplied by a correction factor (e.g., 0.95) that lowers the target raw material flow rate, and thereby the target raw material flow rate is determined. As an alternative example, in a case where the storage unit stores only the second table data, if the controller 5 has determined that the oxygen concentration in the raw material is in the first state, then a target raw material flow rate in the second table data is multiplied by a correction factor (e.g., 0.95) that raises the target raw material flow rate, and thereby the target raw material flow rate is determined.

It should be noted that the hydrogen generation apparatus may be configured such that, instead of storing the table data, the storage unit stores a program for performing arithmetic processing to calculate the target raw material flow rate based on the target hydrogen generation amount. The calculation of the target raw material flow rate may be performed by executing the program. In this case, in order to calculate the target raw material flow rate for another state different from a predetermined state, for example, the target raw material flow rate for the predetermined state (e.g., the first state) is multiplied by a correction factor, and thereby the target raw material flow rate for the other state (e.g., the second state) is determined.

The target hydrogen generation amount may be the target hydrogen generation amount itself, or may be an amount correlated with hydrogen generation target (e.g., a target water supply amount; in the case of a fuel cell system, a target power generation amount).

[Variation 1]

In a hydrogen generation apparatus according to Variation 1, when the oxygen concentration in the raw material is in the first state, the controller 5 sets the controlled temperature of the reformer 1 to the first temperature, and when the oxygen concentration in the raw material is in the second state, the controller 5 decreases the flow rate of the raw material supplied to the reformer 1 such that the temperature of the reformer 1 becomes the first temperature.

Other than the above feature, the hydrogen generation apparatus according to Variation 1 may be configured in the same manner as in Embodiment 2.

Next, the hydrogen generation apparatus according to Variation 1 is described in detail.

The hardware configuration of the hydrogen generation apparatus according to Variation 1 may be the same as in Embodiment 1. Therefore, the components of the hydrogen generation apparatus according to Variation 1 are denoted by the same reference signs and names as those used in Embodiment 1, and a detailed description of the components is omitted.

Figure 6:
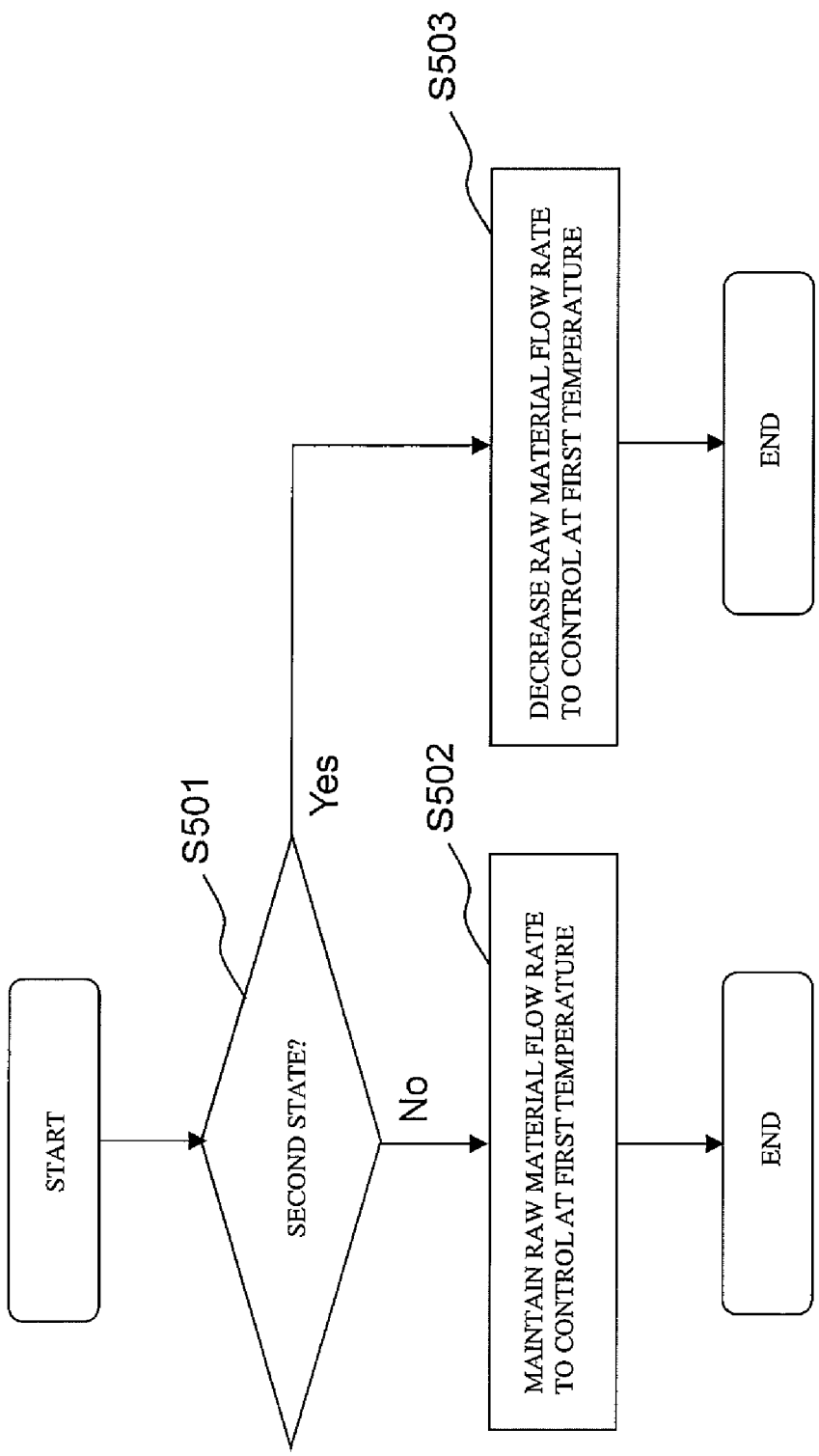
FIG. 6 is a flowchart showing an example of a method of operating a hydrogen generation apparatus according to Variation 1 of Embodiment 2.

FIG. 6 is a flowchart showing an example of a method of operating the hydrogen generation apparatus according to Variation 1 of Embodiment 2.

Hereinafter, the method of operating the hydrogen generation apparatus according to Variation 1 of the present embodiment is described with reference to FIG. 6.

Since the operation in step S501 is the same as the operation in step S401 of FIG. 5, a description of step S501 is omitted.

If the state of the oxygen concentration in the raw material is the first state, the result of the determination in step S501 is No. Accordingly, the controller 5 does not decrease but maintains the flow rate of the raw material supplied to the reformer 1, thereby controlling the temperature of the reformer 1 at the first temperature (step S502), and ends the determination operation (END). Similar to Embodiment 1, this control is performed by controlling the combustion amount of the combustor 2.

The first temperature may be set to 670° C., for example.

If the state of the oxygen concentration in the raw material is the second state, the result of the determination in step S501 is Yes. Accordingly, the controller 5 decreases the flow rate of the raw material supplied to the reformer 1 such that the temperature of the reformer 1 becomes the first temperature (step S503), and ends the determination operation (END). It should be noted that, in order to control the temperature of the reformer 1 at the first temperature, the controller 5 not only decreases the flow rate of the raw material supplied to the reformer 1, but also controls the combustion amount of the combustor 2 similar to Embodiment 1.

[Variation 2]

In a hydrogen generation apparatus according to Variation 2, if the controller 5 is unable to control the temperature of the reformer 1 at the first temperature even when the controller has decreased the flow rate of the raw material, the controller 5 changes the controlled temperature of the reformer 1 to the second temperature higher than the first temperature.

Other than the above feature, the hydrogen generation apparatus according to Variation 2 may be configured in the same manner as at least one of the hydrogen generation apparatuses according to Embodiment 2 and Variation 1 of Embodiment 2. Next, the hydrogen generation apparatus according to Variation 2 is described in detail.

The hardware configuration of the hydrogen generation apparatus according to Variation 2 may be the same as in Embodiment 1. Therefore, the components of the hydrogen generation apparatus according to Variation 2 are denoted by the same reference signs and names as those used in Embodiment 1, and a detailed description of the components is omitted.

Figure 7:
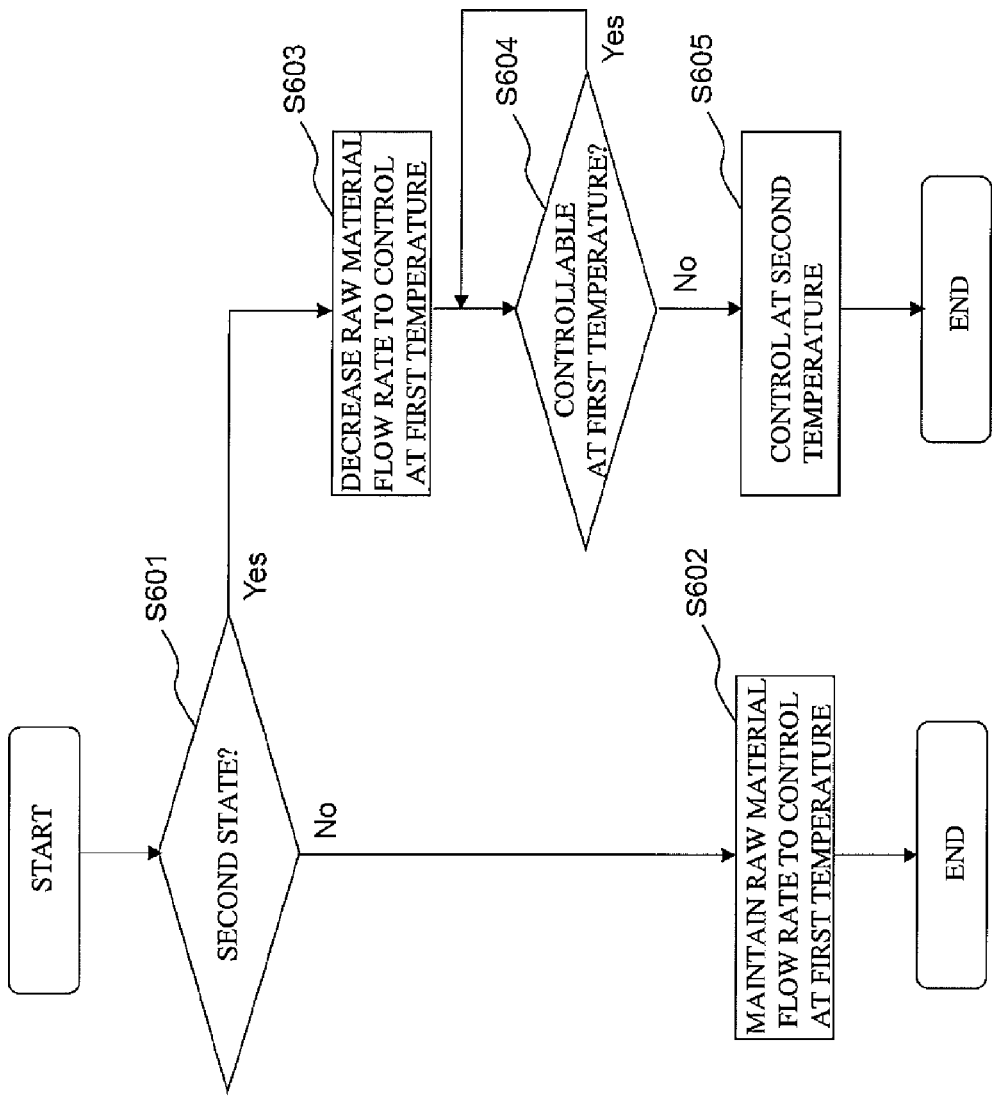
FIG. 7 is a flowchart showing an example of a method of operating a hydrogen generation apparatus according to Variation 2 of Embodiment 2.

FIG. 7 is a flowchart showing an example of a method of operating the hydrogen generation apparatus according to Variation 2 of Embodiment 2.

Hereinafter, the method of operating the hydrogen generation apparatus according to Variation 1 of the present embodiment is described with reference to FIG. 7.

Since the operations in steps S601 to S603 are the same as the operations in steps S501 to S503 in FIG. 6, a description thereof is omitted.

In Variation 2, after step S603, it is determined whether the temperature of the reformer 1 can be maintained at the first temperature, i.e., whether the temperature of the reformer 1 can be controlled at the first temperature (step S604). The determination as to whether the temperature of the reformer 1 can be maintained at the first temperature may be performed, for example, in the following manner: if the temperature of the reformer 1 that is detected by the temperature detector 3 is higher than or equal to the second upper limit temperature (e.g., 710° C.) which is higher than the first temperature, then it is determined that the temperature of the reformer 1 cannot be maintained at the first temperature. It should be noted that the second upper limit temperature is set to a temperature lower than the heatproof temperature of the reformer 1.

If the temperature of the reformer 1 can be controlled at the first temperature, the result of the determination in step S604 is Yes. Accordingly, the operation of the hydrogen generation apparatus is continued.

If the temperature of the reformer 1 cannot be controlled at the first temperature, the result of the determination in step S604 is No. Accordingly, the controlled temperature of the reformer 1 is changed to the second temperature higher than the first temperature (step S605). That is, the controller 5 controls the combustion amount of the combustor 2 such that the temperature of the reformer 1 becomes the second temperature. It should be noted that the second temperature is set to a temperature lower than the heatproof temperature of the reformer 1. The second temperature may be set to 730° C., for example. After the controlled temperature of the reformer is changed to the second temperature, the determination operation is ended (END).

[Variation 3]

In a hydrogen generation apparatus according to Variation 3, after changing the controlled temperature of the reformer 1 to the second temperature, the controller 5 stops the hydrogen generation operation of the reformer if the controller 5 is unable to control the temperature of the reformer 1 at the second temperature.

According to the above configuration, problems regarding the reformer such as breakdown of the reformer or degradation of the reformer can be reduced.

Other than the above feature, the hydrogen generation apparatus according to Variation 3 may be configured in the same manner as at least one of the hydrogen generation apparatuses according to Embodiment 2, Variation 1 of Embodiment 2, and Variation 2 of Embodiment 2.

Next, the hydrogen generation apparatus according to Variation 3 is described in detail.

The hardware configuration of the hydrogen generation apparatus according to Variation 3 may be the same as in Embodiment 1. Therefore, the components of the hydrogen generation apparatus according to Variation 3 are denoted by the same reference signs and names as those used in Embodiment 1, and a detailed description of the components is omitted.

Figure 8:
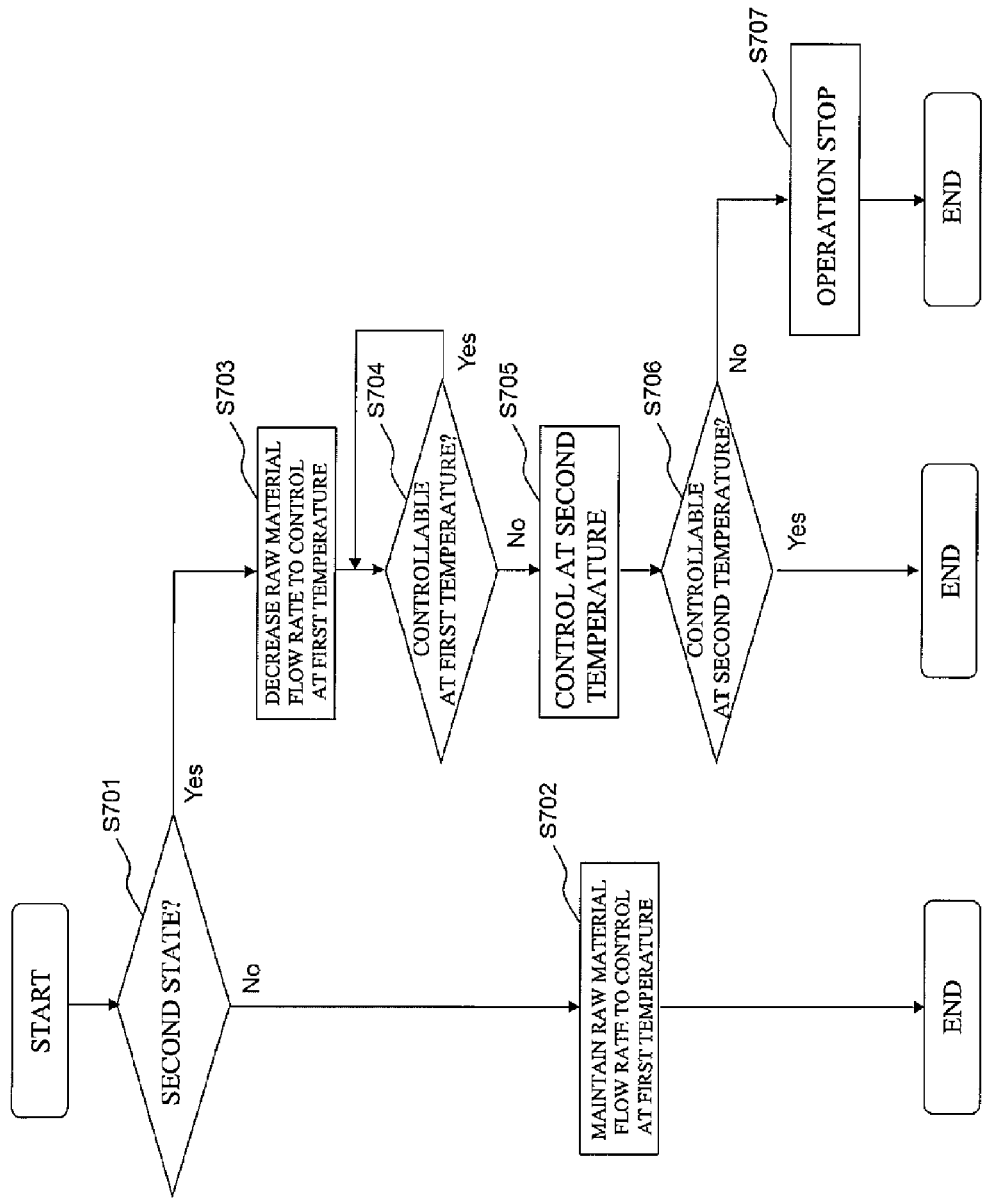
FIG. 8 is a flowchart showing an example of a method of operating a hydrogen generation apparatus according to Variation 3 of Embodiment 2.

FIG. 8 is a flowchart showing an example of a method of operating the hydrogen generation apparatus according to Variation 3 of Embodiment 2.

Hereinafter, the method of operating the hydrogen generation apparatus according to Variation 3 of the present embodiment is described with reference to FIG. 8.

Since the operations in steps S701 to S705 are the same as the operations in steps S601 to S605 in FIG. 7, a description thereof is omitted.

In Variation 3, after step S705, it is determined whether the temperature of the reformer 1 can be maintained at the second temperature, i.e., whether the temperature of the reformer 1 can be controlled at the second temperature (step S706). The determination as to whether the temperature of the reformer 1 can be maintained at the second temperature may be performed, for example, in the following manner: if the temperature of the reformer 1 that is detected by the temperature detector 3 is higher than or equal to a third upper limit temperature (e.g., 750° C.) which is higher than the second temperature, then it is determined that the temperature of the reformer 1 cannot be maintained at the second temperature. It should be noted that the second upper limit temperature is set to a temperature lower than the heatproof temperature of the reformer 1.

If the temperature of the reformer 1 can be controlled at the second temperature, the result of the determination in step S706 is Yes. Accordingly, the operation of the hydrogen generation apparatus is maintained while the controlled temperature of the reformer 1 is maintained at the second temperature, and the determination operation is ended (END).

If the temperature of the reformer 1 cannot be controlled at the second temperature, the result of the determination in step S706 is No. Accordingly, the operation of the hydrogen generation apparatus is stopped (step S707) and the determination operation is ended (END).

In stopping the operation of the hydrogen generation apparatus, the raw material supply device (not shown) and the water supply device (not shown) are stopped from operating, and the hydrogen generation operation of the reformer is stopped. It should be noted that, in stopping the operation of the hydrogen generation apparatus, the combustion by the combustor 2 may be stopped in addition to stopping the raw material supply device (not shown) and the water supply device (not shown) from operating.

Embodiment 3

A fuel cell system according to Embodiment 3 includes: one of the hydrogen generation apparatuses according to Embodiment 1, the variations of Embodiment 1, Embodiment 2, and the variations of Embodiment 2; and a fuel cell configured to generate electric power by using the hydrogen-containing gas that is supplied from the one of the hydrogen generation apparatuses.

According to the above configuration, a possibility that when the oxygen concentration in the raw material is high, the reformer is determined to be overheated and thereby operation stop is caused can be reduced compared to conventional art.

Figure 9:
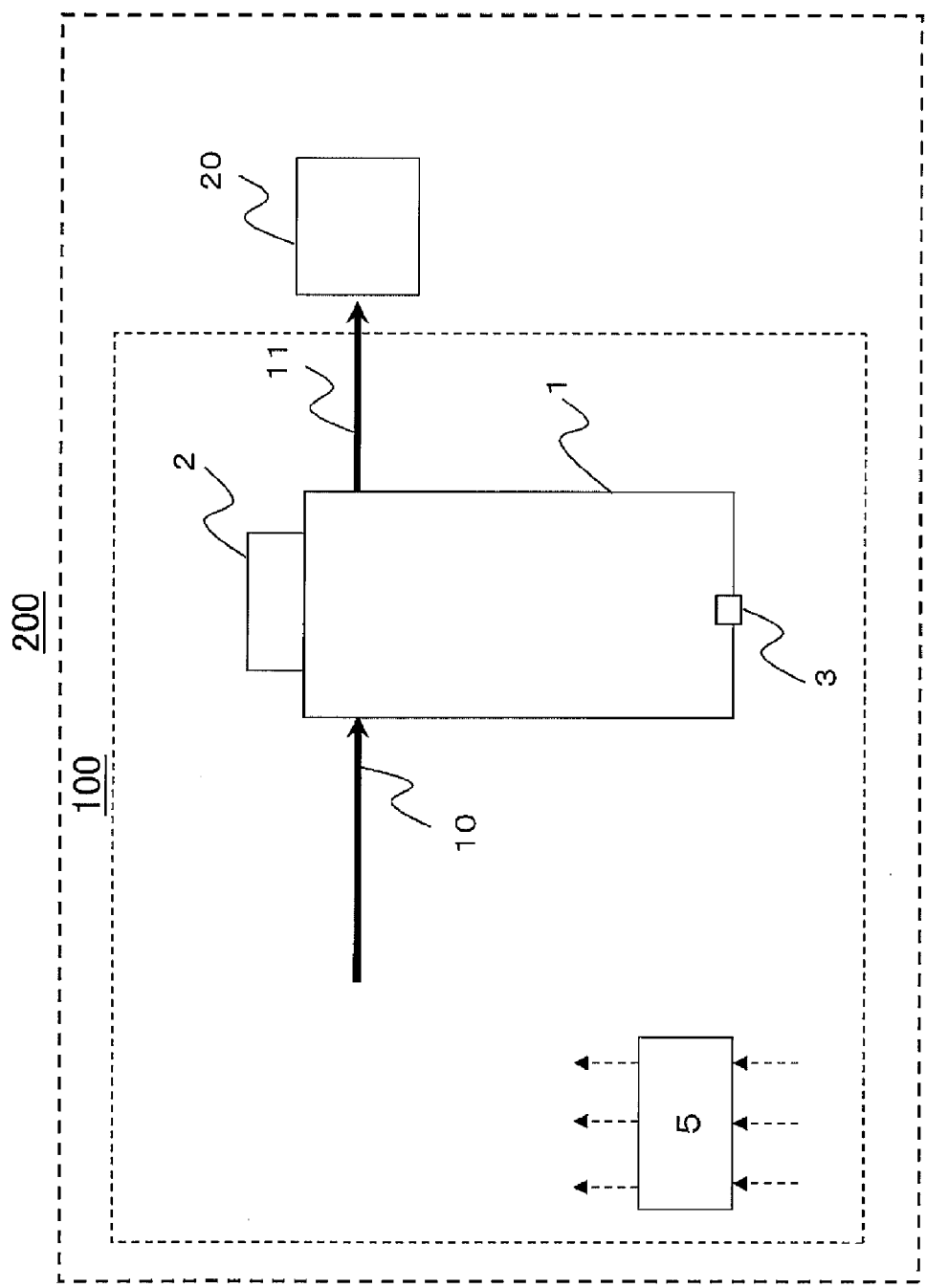
FIG. 9 is a block diagram showing an example of a schematic configuration of a fuel cell system according to Embodiment 3.

FIG. 9 is a block diagram showing an example of a schematic configuration of the fuel cell system according to Embodiment 3. A fuel cell system 200 according to Embodiment 3 includes a fuel cell 20 in addition to the hydrogen generation apparatus 100.

Other than the above configuration, the fuel cell system according to the present embodiment may be configured in the same manner as the hydrogen generation apparatuses according to Embodiment 1, the variations of Embodiment 1, Embodiment 2, and the variations of Embodiment 2. Therefore, common components between FIG. 9 and FIG. 1 are denoted by the same reference signs and names, and a description of such components is omitted.

The fuel cell 20 generates electric power by using the hydrogen-containing gas that is supplied from the hydrogen generation apparatus 100. The fuel cell 20 corresponds to the hydrogen utilizing equipment in Embodiment 1. For example, the fuel cell 20 generates electric power by using the hydrogen-containing gas as a fuel gas and separately supplied air as an oxidizing gas. The fuel cell 20 may include a heat recovery mechanism configured to recover heat that is generated at the same time as the electric power is generated.

The fuel cell 20 may be any type of fuel cell. For example, a polymer electrolyte fuel cell (PEFC), a solid oxide fuel cell, or a phosphoric-acid fuel cell may be used as the fuel cell 20.

In the present embodiment, an operation of the fuel cell system 200 that is performed when the state of the oxygen concentration in the raw material is relatively high may be the same as at least one of the operations described in Embodiment 1 and the variations thereof. Therefore, a detailed description of the operation is omitted.

It should be noted that the fuel cell system 200 according to the present embodiment may be configured such that, in step S205 of Variation 1 of Embodiment 1, not only the operation of the hydrogen generation apparatus 100 but also the electric power generation by the fuel cell 20 is stopped, i.e., the operation of the fuel cell system 200 is stopped.

Alternatively, the fuel cell system 200 according to the present embodiment may be configured such that, in step S305 of Variation 2 of Embodiment 1, not only the operation of the hydrogen generation apparatus 100 but also the electric power generation by the fuel cell 20 is stopped, i.e., the operation of the fuel cell system 200 is stopped.

Further alternatively, the fuel cell system 200 according to the present embodiment may be configured such that, in step S707 of Variation 3 of Embodiment 2, not only the operation of the hydrogen generation apparatus but also the electric power generation by the fuel cell 20 is stopped, i.e., the operation of the fuel cell system 200 is stopped.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The hydrogen generation apparatus, the fuel cell system, and the methods of operating the same, according to the present invention, are useful as a hydrogen generation apparatus, a fuel cell system, and methods of operating the same, which are capable of reducing, as compared to conventional art, a possibility that when an oxygen concentration is high in the raw material, the reformer is determined to be overheated and thereby operation stop is caused.

REFERENCE SIGNS LIST 1 reformer
2 combustor
3 temperature detector
5 controller
10 raw material supply passage
11 hydrogen supply passage
20 fuel cell
100 hydrogen generation apparatus
200 fuel cell system

The invention claimed is:

1. A hydrogen generation apparatus comprising:
a reformer configured to generate a hydrogen-containing gas by causing a reforming reaction of a raw material;
a combustor configured to heat the reformer; and
a controller including a processing circuit and a memory storing a program,
wherein the program, when executed by the processing circuit, causes the controller to:
set a controlled temperature of the reformer to a first temperature when an oxygen concentration in the raw material is in a first state, and
change the controlled temperature of the reformer to a second temperature higher than the first temperature when the oxygen concentration in the raw material is in a second state, where the oxygen concentration in the second state is higher than the oxygen concentration in the first state.

2. The hydrogen generation apparatus according to claim 1, wherein
the program, when executed by the processing circuit, further causes the controller to, after changing the controlled temperature of the reformer to the second temperature, an operation if the controller is unable to control a temperature of the reformer at the second temperature.

3. The hydrogen generation apparatus according to claim 1, wherein
the program, when executed by the processing circuit, further causes the controller to stop an operation when the oxygen concentration in the raw material is in a third state, where the oxygen concentration in the third state is higher than the oxygen concentration in the second state.

4. The hydrogen generation apparatus according to claim 1, wherein
the program, when executed by the processing circuit, further causes the controller to, when the oxygen concentration in the raw material is in the second state, decrease a flow rate of the raw material supplied to the reformer to be lower than the flow rate of when the oxygen concentration is in the first state.

5. The hydrogen generation apparatus according to claim 4, wherein the program, when executed by the processing circuit, further causes the controller to:
when the oxygen concentration in the raw material is in the first state, set the controlled temperature of the reformer to the first temperature, and when the oxygen concentration in the raw material is in the second state, decrease the flow rate of the raw material supplied to the reformer such that a temperature of the reformer becomes the first temperature.

6. The hydrogen generation apparatus according to claim 4, wherein
the program, when executed by the processing circuit, further causes the controller to, when the oxygen concentration in the raw material is in the second state, lower a target raw material flow rate, which is determined corresponding to a target hydrogen generation amount of the reformer, than the target raw material flow rate of when the oxygen concentration is in the first state.

7. The hydrogen generation apparatus according to claim 5, wherein
the program, when executed by the processing circuit, further causes the controller to, if the controller is unable to control the temperature of the reformer at the first temperature even when the controller has decreased the flow rate of the raw material, change the controlled temperature of the reformer to the second temperature higher than the first temperature.

8. The hydrogen generation apparatus according to claim 7, wherein
the program, when executed by the processing circuit, further causes the controller to, after changing the controlled temperature of the reformer to the second temperature, stop an operation if the controller is unable to control the temperature of the reformer at the second temperature.

9. The hydrogen generation apparatus according to claim 1, further comprising an oxygen concentration detector to directly or indirectly detect an oxygen concentration in the raw material.

10. A fuel cell system comprising:
   the hydrogen generation apparatus according to claim 1; and
   a fuel cell configured to generate electric power by using the hydrogen-containing gas that is supplied from the hydrogen generation apparatus.

11. A method of operating a hydrogen generation apparatus, comprising:
   generating, by a reformer, a hydrogen-containing gas by causing a reforming reaction of a raw material;
   heating the reformer by a combustor;
   setting a controlled temperature of the reformer to a first temperature when an oxygen concentration in the raw material is in a first state; and
   changing the controlled temperature of the reformer to a second temperature higher than the first temperature when the oxygen concentration in the raw material is in a second state, where the oxygen concentration in the second state is higher than the oxygen concentration in the first state.

12. The method of operating a hydrogen generation apparatus according to claim 11, further comprising
   when the oxygen concentration in the raw material is in the second state, decreasing a flow rate of the raw material supplied to the reformer to be lower than the flow rate of when the oxygen concentration is in the first state.

13. The method of operating a hydrogen generation apparatus according to claim 11, further comprising directly or indirectly detecting an oxygen concentration in the raw material.

* * * * *